United States Patent
Ljung et al.

(10) Patent No.: US 10,798,569 B2
(45) Date of Patent: Oct. 6, 2020

(54) METHODS FOR SECURELY VALIDATING LOCALIZATION OF A WIRELESS COMMUNICATION DEVICE, AND RELATED DEVICES

(71) Applicant: Sony Mobile Communications Inc., Tokyo (JP)

(72) Inventors: Peter Ljung, Lund (SE); Johan Wadman, Lund (SE); Tobias Harle, Lund (SE); Alexander Thurban, Lund (SE); Patrik Palmér, Lund (SE)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/429,230

(22) Filed: Jun. 3, 2019

(65) Prior Publication Data
US 2020/0015080 A1    Jan. 9, 2020

(30) Foreign Application Priority Data
Jul. 3, 2018   (SE) ..................................... 1850838

(51) Int. Cl.
*H04W 12/04*   (2009.01)
*H04W 4/02*    (2018.01)
*H04B 17/318*  (2015.01)
*H04W 4/021*   (2018.01)
(Continued)

(52) U.S. Cl.
CPC .... *H04W 12/04071* (2019.01); *H04B 17/318* (2015.01); *H04W 4/021* (2013.01); *H04W 4/025* (2013.01); *H04W 12/08* (2013.01); *H04W 84/18* (2013.01)

(58) Field of Classification Search
CPC ........... H04W 4/023; H04W 12/00503; H04W 12/06; H04W 12/08; H04W 4/029; H04W 4/02; H04W 48/04; H04W 4/021; H04W 60/00; H04W 12/10; H04W 64/003; H04L 63/1466; H04L 63/08; H04L 63/107; H04L 63/0492; G06Q 20/389
See application file for complete search history.

(56) References Cited

U.S. PATENT DOCUMENTS

| | | | |
|---|---|---|---|
| 8,646,060 B1 * | 2/2014 | Ben Ayed | ........... H04L 63/0853 |
| | | | 726/9 |
| 9,877,199 B1 * | 1/2018 | Hu | .......................... H04W 4/33 |
| 9,967,750 B1 | 5/2018 | Fernandez | |

(Continued)

FOREIGN PATENT DOCUMENTS

| | | |
|---|---|---|
| EP | 2778709 A1 | 9/2014 |
| WO | 2018097558 A1 | 5/2018 |

OTHER PUBLICATIONS

Search Report counterpart Swedish Patent Application No. 1850838-2, dated Jan. 23, 2019, 10 pages.
(Continued)

*Primary Examiner* — Daniel Lai
(74) *Attorney, Agent, or Firm* — Tucker Ellis LLP

(57) ABSTRACT

A method performed in a location server device of a location system is disclosed. The method is performed for securely validating localization of a wireless communication device. The method comprises obtaining first sensor data sensed by the wireless communication device. The method comprises obtaining primary location information of the wireless communication device, and validating the primary location information based on the first sensor data.

18 Claims, 8 Drawing Sheets

(51) Int. Cl.
*H04W 12/08* (2009.01)
*H04W 84/18* (2009.01)

(56) References Cited

U.S. PATENT DOCUMENTS

| | | | |
|---|---|---|---|
| 2014/0171126 A1 | 6/2014 | Mayor | |
| 2014/0206399 A1* | 7/2014 | Guo | H04L 51/20 |
| | | | 455/456.3 |
| 2014/0289116 A1* | 9/2014 | Polivanyi | H04W 12/0605 |
| | | | 705/44 |
| 2015/0156744 A1 | 6/2015 | Haro | |
| 2015/0339697 A1* | 11/2015 | Park | G06Q 30/0226 |
| | | | 715/748 |
| 2016/0061957 A1* | 3/2016 | Li | G01S 19/47 |
| | | | 342/357.42 |
| 2016/0255604 A1* | 9/2016 | Venkatraman | H04W 24/08 |
| | | | 455/456.1 |
| 2017/0195985 A1* | 7/2017 | Zhao | H04W 64/00 |
| 2017/0211939 A1 | 7/2017 | Cordova | |
| 2017/0272465 A1* | 9/2017 | Steele | H04L 63/101 |
| 2018/0146343 A1 | 5/2018 | Lee | |
| 2018/0374075 A1* | 12/2018 | Tian | H04L 63/08 |
| 2019/0027245 A1* | 1/2019 | Stewart | G16H 40/20 |
| 2019/0074975 A1* | 3/2019 | Koskimies | H04W 12/1006 |

OTHER PUBLICATIONS

European Search Report and Written Opinion from corresponding International Application No. 19177194.8-1214, dated Oct. 31, 2019, 12 pages.

* cited by examiner

METHODS FOR SECURELY VALIDATING LOCALIZATION OF A WIRELESS COMMUNICATION DEVICE, AND RELATED DEVICES

RELATED APPLICATION DATA

This application claims the benefit of Swedish Patent Application No. SE 1850838-2, filed Jul. 3, 2018, the disclosure of which is incorporated herein by reference in its entirety.

TECHNICAL FIELD

The present disclosure pertains to the field of wireless communications and localization. The present disclosure relates to methods for securely validating localization of a wireless communication device, related location server devices, related wireless communication devices, related location systems and related reference electronic devices.

BACKGROUND

Location-based applications and services are more and more deployed and used by users. Location-based applications and services include for example points of interest applications, navigation applications, social sharing applications, and geofencing. Location information is necessary to provide location-based services that are pertinent and useful to the user.

Corrupted location information impacts location-based applications to various degrees. For example, corrupted location information affects, to a higher extent, location-based applications that control access to facilities and geofencing responses than social sharing applications.

There is a need for improving the security of location system for robustness against corrupted location information.

SUMMARY

Accordingly, there is a need for methods for securely validating localization of a wireless communication device, related location server devices, related wireless communication devices, related location systems and related reference electronic devices, which address the need for an improved security of location system and for achieving robustness against corrupted location information resulting from replay attacks from an adversarial electronic device.

A method performed by a location server device of a location system is disclosed. The method is performed for securely validating localization of a wireless communication device. The method comprises obtaining first sensor data sensed by the wireless communication device. The method comprises obtaining, preferably based on a first signal from a reference electronic device, primary location information of the wireless communication device, and validating the primary location information based on the first sensor data.

The present disclosure provides, inter alia, robustness against replay attacks by validating the location information obtained by the location server device using sensor data sensed by the wireless communication device. Stated differently, the disclosed method performed by the location server device provides protection against replay attacks targeting wireless positioning systems or localization systems by cross-checking whether the location obtained for the same wireless communication device can be correlated, or validated by a correlation with the sensor data sensed by the wireless communication device. It is an advantage that the primary location information and the sensor data are independent, such as originating from different devices, as this adds to the robustness against attacks.

The present disclosure provides a method performed by a reference electronic device according to this disclosure. The method is performed for securely validating localization of one or more wireless communication devices. The method comprises receiving a signal from a wireless communication device, wherein the signal comprises an identifier identifying the wireless communication device, and sensor data sensed by the wireless communication device. The method comprises generating reference data based on the signal. The reference data comprises an indicator of the signal characteristic associated with the signal received at the first reference electronic device from the wireless communication device. The indicator comprises one or more of: a signal strength indicator associated with the signal, a time indicator indicative of time of flight or phase shift associated with the signal, an indicator of time of arrival, and an indicator of direction of arrival. The method comprises transmitting the reference data and the sensor data to a location server device The method performed by the reference electronic device supports a secure architecture for localization which is robust against replay attacks, when reference electronic devices are involved.

This disclosure relates to a method, performed by a location system, for enabling secure localization of a wireless communication device. The location system comprises the wireless communication device and a location server device. The wireless communication device comprises a sensor. The method comprises obtaining, at the wireless communication device, sensor data from the sensor and transmitting, from the wireless communication device, a signal comprising an identifier identifying the wireless communication device, and the sensor data. The method comprises obtaining, at the location server device, the sensor data sensed by the wireless communication device; obtaining, at the location server device, primary location information of the wireless communication device, and validating, at the location server device, the primary location information based on the sensor data. The method comprises obtaining, at the location server device, the signal comprising the sensor data sensed by the wireless communication device; obtaining, at the location server device, primary location information of the wireless communication device, preferably based on a first signal from a reference electronic device, and validating, at the location server device, the primary location information based on the sensor data.

The method performed by the location system supports a secure architecture for localization which is robust against replay attacks by including a sensor data in the signal transmitted by the wireless communication device and validating the location information with the sensor data at the location server device.

This disclosure provides a location server device comprising a memory module, an interface module, and a processor module. The location server device is configured to perform any of the methods disclosed herein for securely validating localization of a wireless communication device.

This disclosure provides a reference electronic device comprising a memory module, an interface module, and a processor module. The reference electronic device is configured to perform any of the methods disclosed herein for securely validating localization of one or more wireless communication devices.

This disclosure provides a wireless communication device comprising a memory module, an interface module, and a processor module. The wireless communication device is configured to perform any of the methods disclosed herein for enabling secure localization of the wireless communication device.

This disclosure provides a location system comprising a wireless communication device and a location server device. The wireless communication device comprises a sensor. The location system is configured to perform any of the methods disclosed herein for enabling secure localization of the wireless communication device.

The disclosed location server devices, wireless communication device, reference electronic devices provide advantages disclosed for the respective methods.

BRIEF DESCRIPTION OF THE DRAWINGS

The above and other features and advantages of the present disclosure will become readily apparent to those skilled in the art by the following detailed description of exemplary embodiments thereof with reference to the attached drawings, in which.

DETAILED DESCRIPTION

Figure 1:
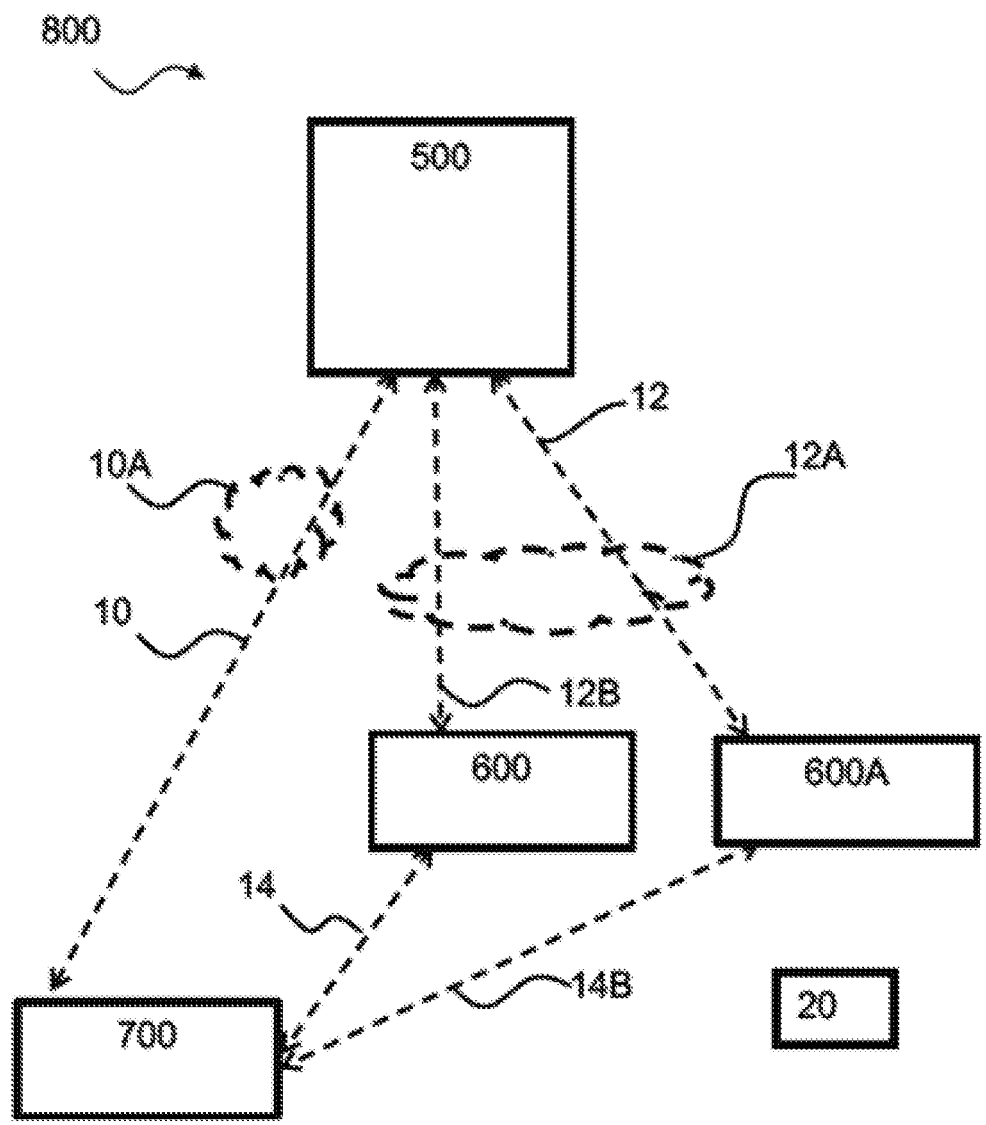
FIG. 1 schematically illustrates an exemplary location system according to this disclosure.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

The figures are schematic and simplified for clarity, and they merely show details which are essential to the understanding of the invention, while other details have been left out. Throughout, the same reference numerals are used for identical or corresponding parts.

FIG. 1 schematically illustrates an exemplary location system 800 according to this disclosure.

This disclosure provides a location system 800 comprising a wireless communication device 700 and a location server device 500. The wireless communication device comprises a sensor. The location system 800 is configured to perform any of the methods disclosed herein for enabling secure localization of the wireless communication device 700.

The location system 800 comprises a location server device 500 configured to perform any of the methods disclosed herein and a wireless communication device 700 configured to provide sensor data.

A location server device 500 is seen as a computing device configured to communicate with one or more electronic devices and/or to act as a server for an electronic device acting as a client. In other words, a location server device 500 is optionally configured to receive a request from one or more electronic devices and provide a response back. The one or more electronic devices may be one or more of: a wireless communication device (e.g. wireless communication device 700), a reference electronic device (e.g. the first reference electronic device 600), and any other external electronic device (e.g. an electronic device of a location-based service provider).

A wireless communication device 700 is seen as a computing device configured to communicate with one or more electronic devices and to provide sensor data. Examples of computing device comprise an electronic device (e.g. a fixed electronic device and/or a portable electronic device (e.g. a mobile device, a tablet device, and/or a laptop device)), and/or a wireless electronic device (e.g. a mobile terminal, and/or a network node).

Examples of wireless communication devices include a beacon device, and/or a tag device.

A location server device 500 may be configured to communicate using a wireless communication system and/or a wired communication system (e.g. an Internet Protocol, IP-based system, and/or an Ethernet-based system). A wireless communication device 700 may be configured to communicate using a wireless communication system. Examples of wireless communication systems comprise a short-range communication system (e.g. a near-field communication system, a BLUETOOTH system, an ultra-wide band system, ZIGBEE, IEEE 802.11) and/or a cellular communication system (e.g. a 3rd Generation Partnership Project, 3GPP, cellular system), and/or a wireless local area network system (e.g. IEEE 802.11) and/or an acoustic localization system (e.g. Sound Navigation And Ranging, SONAR, system). The wireless communication device 700 may be configured to send or broadcast a signal comprising an identifier identifying the wireless communication device (e.g. a beacon identifier).

The location system 800 comprises optionally a first reference electronic device 600. A reference electronic device (e.g. the first reference electronic device 600) is seen as a computing device configured to communicate with one or more electronic devices, e.g. the location server device 500 and the wireless communication device 700. A reference electronic device (e.g. the first reference electronic device 600) may be configured to support the location system 800 in obtaining location information of the wireless communication device 700. A reference electronic device (e.g. the first reference electronic device 600) may be configured to communicate using a wireless communication system and/or a wired communication system (e.g. an Internet Protocol, IP-based system, and/or an Ethernet-based system). Examples of reference electronic devices include a reader device, and/or an anchor device, and/or a gateway device and/or a Fixed Reference Point device. For example, a reference device listens for a wireless communication device. For example, a reference device may be static positioned and used for scanning the wireless communication device. For example, a reference device may be configured to detect the Received Signal Strength Indicator, RSSI of a signal from the wireless communication device. The signal from the wireless communication device may comprise an identifier identifying the wireless communication device. For example, the location server device may be configured to receive and combine one or more RSSIs for the same identifier obtained from one or more reference electronic devices to determine positioning of the wireless communication device.

The first reference electronic device 600 may form part of a group of reference electronic devices. The location system 800 may comprise a second reference electronic device 600A. The second reference electronic device 600A may form part of a group of reference electronic devices. The location system 800 may comprise a group of reference electronic devices comprising N reference electronic devices, wherein N is an integer ranging from 1 to 100.

In one or more exemplary location systems, the wireless communication device 700 is configured to connect, via a reference electronic device 600, 600A, with the location server device 500 which is either located in an intranet or as a cloud-based server. A reference electronic device 600, 600A may be seen as a gateway between the wireless communication device 700 (using a short-range wireless system) and the location server device 500 (via e.g. wireless local area network or Ethernet). It may be envisaged that a plurality of reference electronic devices sense the same wireless communication device 700 (e.g. based on signal strength) and relay sensor data measured in the wireless communication device 700 to the location server device 500. The location system 800 comprises optionally a second reference electronic device 600A.

In one more exemplary location systems, any of the first reference electronic device 600 and the second reference electronic device 600A is configured to act as a location server device.

In one or more exemplary location systems, the wireless communication device 700 is configured to communicate with the location server device 500 via a communication link 10, such as a uni or bi-directional communication link. The communication link 10 may be a single hop communication link or a multi-hop communication link. The communication link 10 may be carried over a wireless communication system 10A, such as one or more of: a short-range communication system (e.g. a near-field communication system, a BLUETOOTH system, an ultra-wide band system, ZIGBEE, IEEE 802.11) and/or a cellular communication system (e.g. a 3rd Generation Partnership Project, 3GPP, cellular system), and/or a wireless local area network system (e.g. IEEE 802.11).

In one or more exemplary location systems, the first reference electronic device 600 is configured to communicate with the location server device 500 via a communication link 12, such as a uni or bi-directional communication link. In one or more exemplary location systems, the second reference electronic device 600A is configured to communicate with the location server device 500 via a communication link 12B, such as a uni or bi-directional communication link. The communication link 12, 12B may be a single hop communication link or a multi-hop communication link. The communication link 12, 12B may be carried over a wireless communication system 12A, such as one or more of: a short-range communication system (e.g. a near-field communication system, a BLUETOOTH system, an ultra-wide band system, ZIGBEE, IEEE 802.11) and/or a cellular communication system (e.g. a 3rd Generation Partnership Project, 3GPP, cellular system), and/or a wireless local area network system (e.g. IEEE 802.11).

In one or more exemplary location systems, the first reference electronic device 600 is configured to communicate with wireless communication device 700 via a communication link 14, such as a uni or bi-directional communication link. In one or more exemplary location systems, the second reference electronic device 600A is configured to communicate with the location server device 500 via a communication link 14B, such as a uni or bi-directional communication link. The communication link 14, 14B may be a single hop communication link or a multi-hop communication link. The communication link 14, 14B may be carried over a wireless communication system, such as one or more of: a short-range communication system (e.g. a near-field communication system, a BLUETOOTH system, an ultra-wide band system, ZIGBEE, IEEE 802.11) and/or a cellular communication system (e.g. a 3rd Generation Partnership Project, 3GPP, cellular system), and/or a wireless local area network system (e.g. IEEE 802.11).

FIG. 1 shows an exemplary adversarial electronic device 20 to illustrate one or more attacks that are prevented by the present disclosure. An adversarial electronic device refers to a corrupted electronic device, such as a corrupted wireless communication device and/or a corrupted reference electronic device and/or a corrupted external device. A corrupted electronic device may be seen an electronic device controlled by an adversary, such as attacker, attempting to attack the location system 800. A corrupted electronic device may be seen an electronic device that is deficient or malfunctioning, thereby resulting in providing corrupted signals or information to the location system 800. An attack by the adversarial electronic device 20 involves providing corrupted signals (e.g. a replayed signal). A corrupted signal refers to a signal that is not legitimate, for example a signal that is transmitted by a corrupted electronic device at a "false" location in the present disclosure (e.g. a signal reflecting a location which is not a legitimate location of the adversarial device 20 in order to deceive the location server device 500 in accepting an illegitimate location for a legitimate wireless communication device). When a corrupted signal is accepted by the location server device, the attacker is able to e.g. fraudulently gain access to location-based services associated with the location targeted by the attacker, and/or to deceive the location system 800 to "incorrectly" determine that an attacked wireless communication device is at a different location than where the attacked wireless communication device actually is located. A "fake" location may be seen as a location that is different from the location where the adversarial electronic device 20 is located or a location that is different from the location where the legitimate wireless communication device is located.

The adversarial electronic device 20 performs a replay attack (also called a relay attack) against one or more electronic devices of a location system. The adversarial electronic device 20 is configured to perform the replay attack by transmitting a corrupted signal to the first reference electronic device 600 and/or the second reference electronic device 600A and/or the location server device 500. The adversarial electronic device 20 is configured to generate a corrupted signal based on a signal obtained originating at the wireless communication device 700 (e.g. by having an additional adversarial device eavesdropping the signal broadcasted by the wireless communication device 700 or by receiving the signal from the additional adversarial electronic device which has eavesdropped the signal).

The adversarial electronic device 20 is optionally configured to communicate (e.g. passively listen, or passively receive) with the wireless communication device 700, in order to receive signals transmitted (e.g. broadcasted) by the wireless communication device 700.

An additional adversarial electronic device is configured to support the replay attack by eavesdropping, recording and/or storing a signal from the wireless communication device 700 at a first location, and by transmitting the eavesdropped and/or recorded and/or stored signal to the adversarial electronic device 20 which is located at a second location different from the first location. The eavesdropped and/or recorded and/or stored signal may be referred to as the corrupted signal.

In the replay attack, the adversarial electronic device 20 is configured to perform the replay attack by receiving, at the second location different from a first location, the signal from the additional adversarial electronic device which has eavesdropped the signal from the wireless communication device 700 at the first location, and by transmitting at the second location the received signal to the location server device 500 and/or the reference electronic device 600, 600A.

The present disclosure provides inter alia robustness against replay attacks disclosed herein by validating the location information obtained by the location server device using sensor data sensed by the wireless communication device. An adversarial electronic device carrying out the replay attack exposed in the previous paragraphs fails to deceive or trick the location system 800 disclosed herein because the present disclosure provides that the location server device receives sensor data sensed by the wireless communication device and validates the location information using the sensor data. This way, the location server device is capable of rejecting "false" location information that are not supported, validated or corroborated by the sensor data. If a wireless communication device has indeed moved, the sensor data sensed by the wireless communication device and received at the location server device and the location information obtained by the location server device for the same wireless communication device would correlate and thereby be validated by the present disclosure. Otherwise, when the sensor data and the location information would not correlate, the location server rejects the location information. An adversarial electronic device is unable to forge sensor data to match the movement leading in the location information attacked. The present disclosure therefore leads to an improved security and reliability of the location information used in a location system as disclosed herein.

This may particularly advantageous in various non-limiting scenarios where attackers can gain fraudulent benefit in the following exemplary situations. For example, when the wireless communication device is used to protect against theft of equipment or goods, a geo-fence can be setup the wireless communication device to send an alarm signal when an item is outside of a restricted area and an attacker or thief can benefit if the alarm doesn't go off by replacing a legitimate wireless communication device with a "fake" wireless communication device replaying legitimate signals. For example, when item locations drive work flows and processes within e.g. medical care, a geo-fence can be used to trigger a process change, a worker might want to take short-cuts in the workflow while in a digital queuing system it might be mandatory to stay within a certain area to keep your place in the queue. An attacker in this example may attempt to leave and keep the place in the queue. For example, for a digital renting system of e.g. magazines and other media in e.g. library and cafes, a geo-fence can be setup where renting or free access is allowed, and an attacker attempts to benefit by being able to access content outside permitted area.

Figure 2A:
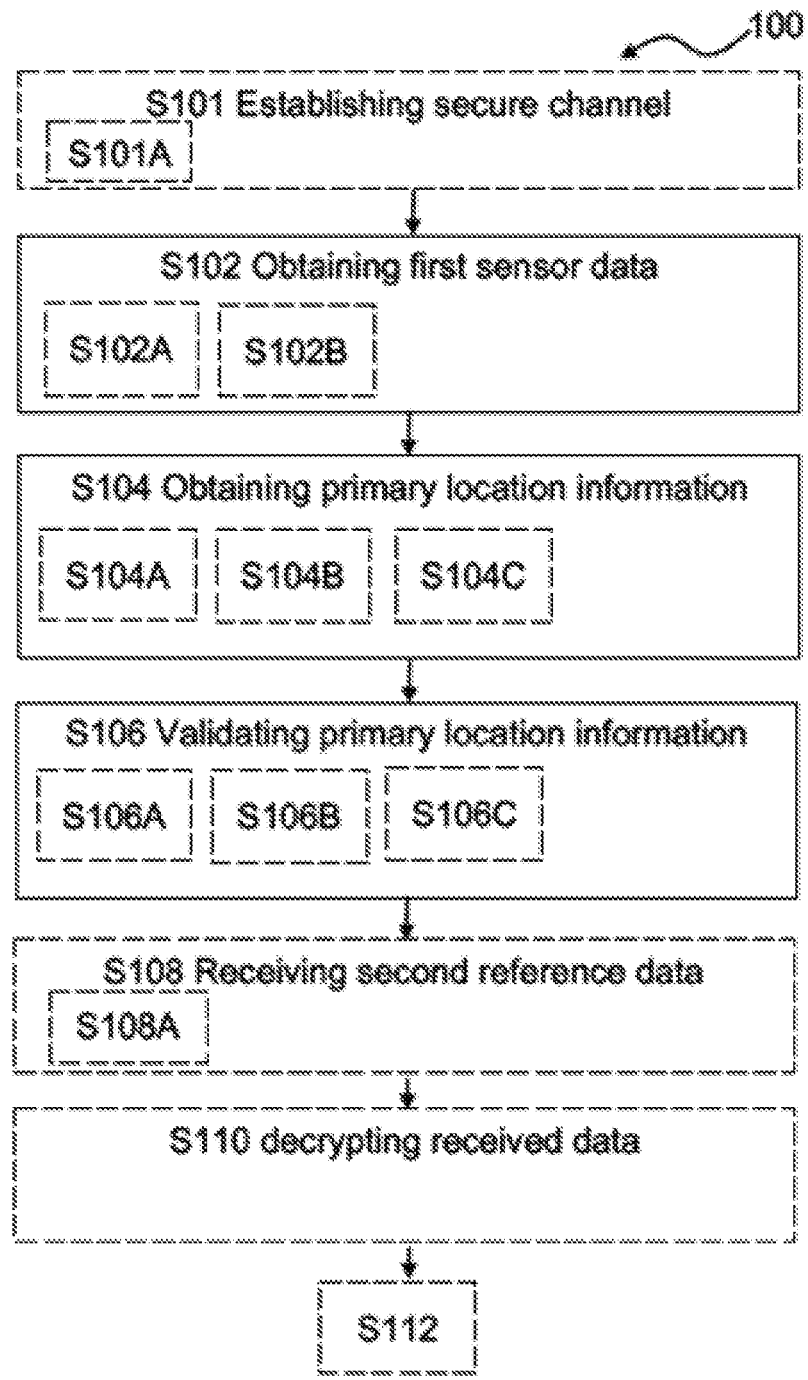
FIGS. 2A-2B are flow diagrams of an exemplary method performed by a location server device according to the disclosure
Figure 2B:
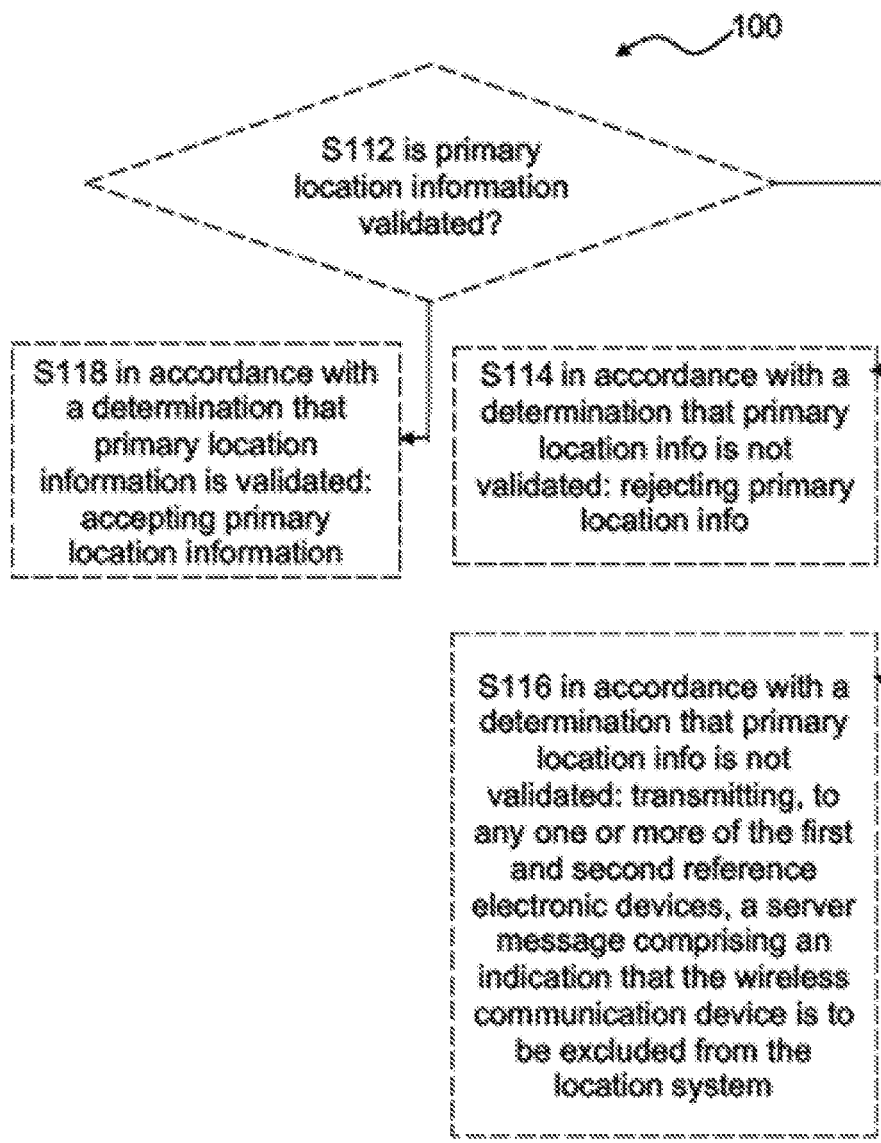

FIGS. 2A-2B are flow diagrams of an exemplary method 100 performed by a location server device according to the disclosure. The method 100 is performed by a location server device 500 of a location system 800, for securely validating localization of a wireless communication device (e.g. wireless communication device 700). The method 100 comprises obtaining S102 first sensor data sensed by the wireless communication device (e.g. receiving the first sensor data sensed by the wireless communication device). The method 100 comprises obtaining S104 primary location information of the wireless communication device, and validating S106 the primary location information based on the first sensor data.

The method performed by the location server device provides, inter alia, an improved security and robustness against replay attacks from adversarial electronic devices attempting to corrupt the localization. By correlating, movement from sensor data and movement from obtained location information of the wireless communication device, it can be determined which wireless communication device is valid (i.e. not corrupted or not compromised by an attacker).

In one or more exemplary methods and location server devices, validating S106 the primary location information based on the first sensor data comprises determining S106A secondary location information based on the first sensor data. In one or more exemplary methods and location server devices, validating S106 the primary location information based on the first sensor data comprises verifying S106B the primary location information using the secondary location information, e.g. by comparing the primary location information and the secondary location information, e.g. by correlating primary location information and the secondary location information. In one or more exemplary methods and location server devices, validating S106 the primary location information based on the first sensor data comprises deriving an estimate of maximum distance travelled based on the first sensor data (assuming the same direction), determining a set of secondary location information based the maximum distance, comparing the primary location information with the set of secondary location information, determining whether the primary location information is comprised in the set of secondary location information. The set of secondary location information comprises one or more secondary location information. When the first sensor data comprises accelerometer data, characterizing e.g. acceleration over time, deriving an estimate of maximum distance travelled based on the first sensor data including acceleration (assuming the same direction) comprises e.g. integrating acceleration over time to obtain velocity, and integrating velocity over time to obtain a maximum travelled distance (e.g. using multiple values to perform numerical integration). When the first sensor data comprises accelerometer data, characterizing e.g. acceleration over time, deriving an estimate of maximum distance travelled based on the first sensor data (assuming the same direction) comprises optionally determining acceleration over time (and determining whether the acceleration over time correlates with the set of secondary location information. In one or more exemplary methods and location server devices, the first sensor data optionally comprises a maximum distance travelled in a time period, validating S106 the primary location information based on the first sensor data comprises comparing the maximum distance received in the first sensor data with the estimated distance based on signal strength. For example, if maximum distance received in the first sensor data is higher than the determined distance (from signal strength), then validation of the primary location information is successful. This gives some assurance that the location system has not been breached.

In one or more exemplary methods and location server devices, obtaining S104 the primary location information of the wireless communication device comprises receiving S104A the primary location information. For example, receiving S104A the primary location comprises retrieving the primary location from a memory module of the location server device, (and/or from another device). For example, receiving S104A the primary location comprises receiving the primary location information in the first signal. In one or more exemplary methods and location server devices, the first signal comprises an identifier identifying the wireless communication device. An identifier is seen herein as an identifier uniquely identifying the wireless communication device.

In one or more exemplary methods and location server devices, obtaining S104 the primary location information of the wireless communication device comprises receiving S104A the primary location information (e.g. from the wireless communication device, e.g. from a reference electronic device, e.g. from an external device).

In one or more exemplary methods and location server devices, obtaining S104 the primary location information of the wireless communication device comprises generating the primary location information. The primary location information may be obtained or generated from reference data generated by a reference electronic device based on the signal from the wireless communication device. The reference data may comprise an indicator of a signal characteristic associated with the signal from the wireless communication device as received at the reference electronic device. Such indicator may for example comprise one or more of: a signal strength indicator associated with a signal, a time indicator indicative of time of flight or phase shift associated with a signal, an indicator of time of arrival, and an indicator of direction of arrival.

In one or more exemplary methods and location server devices, obtaining S102 first sensor data sensed by the wireless communication device comprises receiving S102A a first signal associated with the wireless communication device. For example, receiving S102A the first signal associated with the wireless communication device comprises receiving the first signal from the wireless communication device. For example, receiving S102A the first signal associated with the wireless communication device comprises receiving the first signal from a device other than the wireless communication device (e.g. a reference electronic device), the first signal comprising an identifier identifying the wireless communication device.

In one or more exemplary methods and location server devices, obtaining S104 the primary location information of the wireless communication device comprises obtaining S104B, based on the first signal, the primary location information of the wireless communication device. In one or more exemplary methods and location server devices, the first signal comprises an identifier identifying the wireless communication device and obtaining, based on the first signal, primary location information of the wireless communication device is performed based on the identifier of wireless communication devices comprised in the first signal.

In one or more exemplary methods and location server devices, obtaining S102 the first sensor data sensed by the wireless communication device comprises receiving, S102B from a first reference electronic device of a group of reference electronic devices, first reference data and the first sensor data sensed by the wireless communication device. For example, receiving, S102B from a first reference electronic device of a group of reference electronic devices, first reference data and the first sensor data sensed by the wireless communication device may comprise receiving a first reference signal associated with the wireless communication device, the first reference signal comprising the first reference data and the first sensor data sensed by the wireless communication device. Optionally, the first reference data comprises an identifier identifying the wireless communication device.

In one or more exemplary methods and location server devices, the method 100 comprises: receiving S108 second reference data (e.g. by receiving a second reference signal from a second reference electronic device of the group of the reference electronic devices, wherein the second reference signal comprises second reference data). In one or more exemplary methods and location server devices, obtaining S104 the primary location information of the wireless communication device comprises determining S104C, based on the second reference data, the primary location information of the wireless communication device. Optionally, the second reference data comprises an identifier identifying the wireless communication device. This provides further reliability in that the primary location information is derived based on the second reference data, which allows comparing the primary location information obtained in S104C with the primary location obtained by performing any of S104, S104A, and S104B.

In one or more exemplary methods and location server devices, receiving S108 the second reference data comprises receiving S108A second sensor data sensed by the wireless communication device. In one or more exemplary methods and location server devices, validating S106 the primary location information based on the first sensor data comprises validating S106C the primary location information based on the first sensor data and the second sensor data (e.g. using the second sensor data for comparison). For example, validating the primary location information based on the first sensor data and the second sensor data comprises comparing the first sensor data and the second sensor data. The first sensor data reported by the first reference electronic device and the second sensor data reported by the second reference electronic device should be the same when received at the same time or within the same time slot or within the same time window. For example, validating the primary location information based on the first sensor data and the second sensor data comprises obtaining the first sensor data corresponding to a time window and the second sensor data corresponding to the time window, and comparing the first sensor data and the second sensor data. Additionally, or alternatively, validating S106C the primary location information based on the first and second sensor data may comprise determining a tertiary location information based on the second reference data (e.g. based on provided RSSI), and verifying the primary location information using the tertiary location information (e.g. by comparison, and/or by correlation). When the tertiary location information is found to correlate with the primary location information, the primary location is validated by the location server device. This provides an improved security in that the primary location information is additionally validated by the location server device using on a location information determined based on second reference data (determined independently from the primary location information).

In one or more exemplary methods and location server devices, the first sensor data comprises motion sensor data and/or timing data. In one or more exemplary methods and location server devices, the second sensor data comprises motion sensor data and/or timing data. For example, motion sensor data comprises data generated by motion sensor comprised in the wireless communication device. For example, motion sensor data comprises accelerometer data (e.g. provided by an accelerometer sensor) and/or timing data. Motion sensor data may include raw accelerometer data and/or data characterizing a maximum movement between two time instances. For example, motion sensor data comprises timestamped accelerometer data (e.g. provided by an accelerometer sensor). Motion sensor data may data characterizing one or more of the following motions related to the wireless communication device: a movement and/or a series of movements; and/or a position and/or an orientation; and/or a location and/or a path and/or a tilt and/or a vibration. Motion sensor data is very difficult to tamper with, and modify for a correlated attack of sensor data and any of: reference data and location information. This thereby provides an improved security against replay attacks. Using the motion sensor data, the maximum movement of the wireless communication device is determined over time by this disclosure. The motion sensor data is transmitted to the location server device in a protected manner using encryption of the motion sensor data.

In one or more exemplary methods and location server devices, the first sensor data optionally comprises a sensor data enabling a derivation of a maximum distance travelled in a time period (e.g. over a previous period of time, e.g. over a preceding period of time). In one or more exemplary methods and location server devices, the second sensor data optionally comprises a sensor data enabling a derivation of a maximum distance travelled in a time period (e.g. over a previous period of time, e.g. over a preceding period of time). In one or more exemplary methods and location server devices, the first sensor data optionally comprises a maximum distance travelled in a time period (e.g. over a previous period of time, e.g. over a preceding period of time). In one or more exemplary methods and location server devices, the second sensor data optionally comprises a maximum distance travelled in a time period (e.g. over a previous period of time, e.g. over a preceding period of time). For example, a wireless communication device cannot reasonably appear to be located at a new location (between time t0 to t1) when the sensor data does not reflect such a movement, i.e. the wireless communication device provides sensor data characterizing e.g. no acceleration between t0 and t1. In a situation where a wireless communication device is assumed to rotate during movement, a maximum movement from a 3-axis accelerometer may be determined by the location server device. Using the sensor data including accelerometer data between t0 and t1, a maximum movement is determined by the location server device. Sensor data may include maximum distance in last time window (t0-t1).

The present disclosure allows to cross check location information obtained against sensor data to protect from replay attack targeting positioning of the wireless communication device.

In one or more exemplary methods and location server devices, the first reference data comprises an indicator of a signal characteristic associated with a signal received at the first reference electronic device from the wireless communication device, wherein the indicator comprises one or more of: a signal strength indicator associated with a signal, a time indicator indicative of time of flight or phase shift associated with a signal, an indicator of time of arrival, and an indicator of direction of arrival. In one or more exemplary methods and location server devices, the second reference data comprises an indicator of a signal characteristic associated with a signal received at the second reference electronic device from the wireless communication device, wherein the indicator comprises one or more of: a signal strength indicator associated with a signal, a time indicator indicative of time of flight or phase shift associated with a signal, an indicator of time of arrival, and an indicator of direction of arrival.

In one or more exemplary methods and location server devices, the method 100 comprises establishing S101 a secure channel between the location server device and a sender of any one or more of: the first sensor data, the second sensor data, the first reference data, and the second reference data. The sender may comprise the wireless communication device (e.g. wireless communication device 700 of FIGS. 1 and/or 7), a reference electronic device (e.g. reference electronic device 600, 600A of FIGS. 1 and/or 6). In one or more exemplary methods and location server devices, establishing S101 a secure channel comprises S101A: receiving encrypted signals and/or integrity-protected signals and/or authenticating the sender of any one or more of: the first sensor data, the second sensor data, the first reference data, and the second reference data. This provides an increased robustness against impersonation attacks, modification attacks, eavesdropping etc.

In one or more exemplary methods and location server devices, establishing S101 a secure channel comprises establishing an end-to-end secure channel between the location server device and the wireless communication device by protecting, end-to-end, the first sensor data between the wireless communication device and the location server device. This way, the first sensor data is protected even if the reference electronic device is not fully trusted. Sensor data is for example sent through several reference electronic devices so many reference electronic devices have to be compromised to attack sensor data.

In one or more exemplary methods and location server devices, establishing S101 a secure channel comprises establishing a secure channel between the location server device and the reference electronic device to secure reference data added by reference electronic device (e.g. indicator of signal strength and time).

In one or more exemplary methods and location server devices, the method 100 comprising decrypting S110 received data using shared keying material. Received data comprises any one or more of: the first sensor data, the second sensor data, the first reference data, and the second reference data. The shared keying material comprises for example a symmetric session key generated during secure channel establishment (using a shared secret or a public key infrastructure, PKI, based handshake).

As illustrated in FIG. 2B, in one or more exemplary methods and location server devices, the method 100 comprises determining S112 whether that the primary location information is validated based on outcome of step S106.

In one or more exemplary methods and location server devices, the method 100 comprises in accordance with a determination that the primary location information is not validated: rejecting S114: the primary location information; and transmitting S116, to any one or more of the first and second reference electronic devices, a server message comprising an indication that the wireless communication device is to be excluded from the location system (e.g. added to a black list of corrupted electronic devices).

In one or more exemplary methods and location server devices, the method 100 comprises S118: in accordance with a determination that the primary location information is validated: accepting the primary location information.

Figure 3:
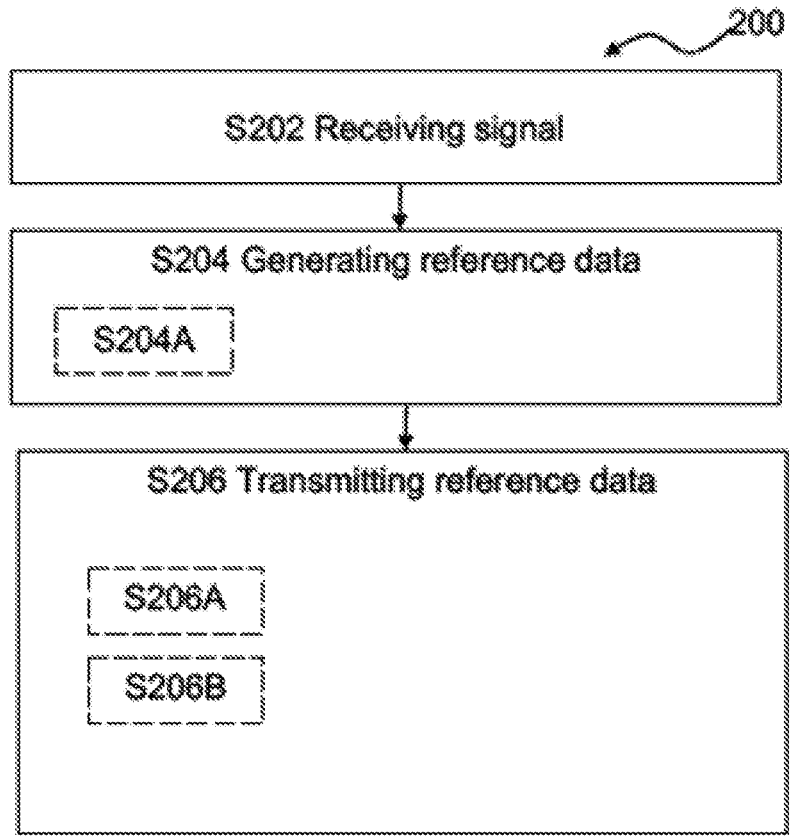
FIG. 3 is a flow diagram of an exemplary method performed by a reference electronic device according to the disclosure
Figure 5:
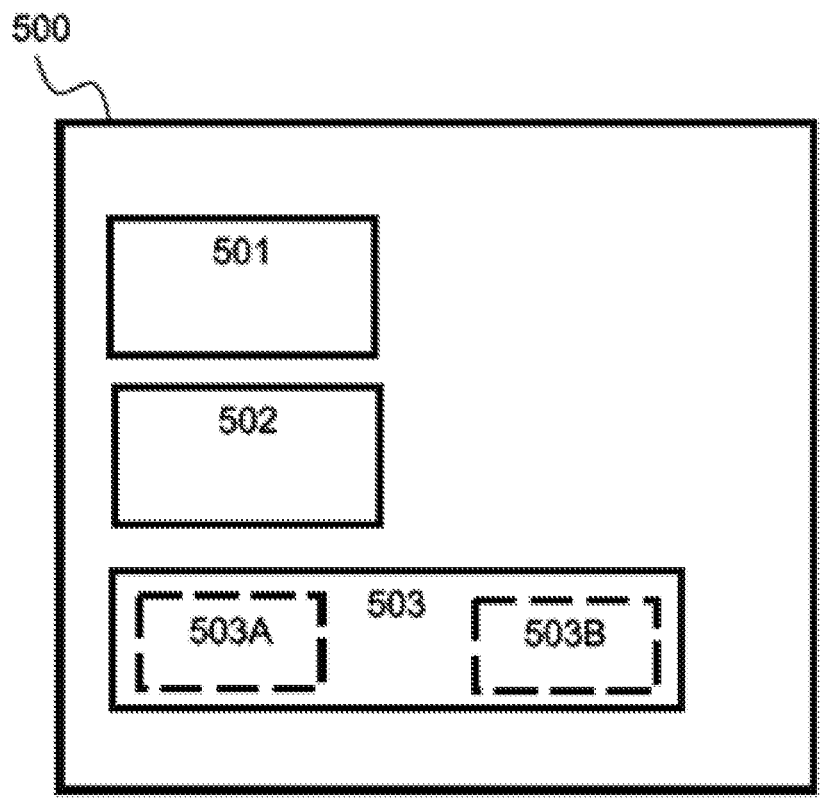
FIG. 5 is a block diagram schematically illustrating an exemplary location server device according to the disclosure, FIG. 6 a block diagram schematically illustrating an exemplary reference electronic device according to the disclosure, and FIG. 7 a block diagram schematically illustrating an exemplary wireless communication device according to the disclosure.
Figure 6:
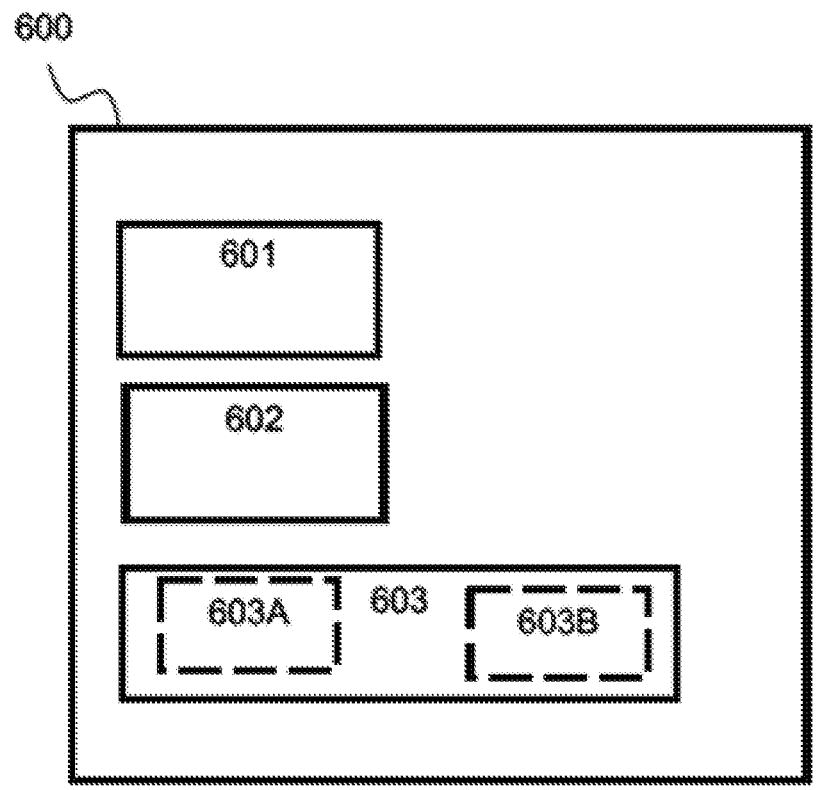

FIG. 3 is a flow diagram of an exemplary method 200 performed by a reference electronic device (e.g. reference electronic device disclosed herein, e.g. reference electronic device 600, 600A of FIG. 1 or FIG. 6) according to this disclosure. The method 200 is performed for securely validating localization of one or more wireless communication devices. The method 200 comprises receiving S202 a signal from a wireless communication device (e.g. wireless communication device 700 of FIG. 1 or 7). The signal comprises a, identifier identifying the wireless communication device, and sensor data sensed by the wireless communication device (e.g. wireless communication device 700 of FIG. 1 or 7). The method 200 comprises generating S204 reference data based on the signal. The reference data comprises an indicator of a signal characteristic associated with a signal received at the reference electronic device from the wireless communication device (e.g. wireless communication device 700 of FIG. 1 or 7). The indicator comprises for example one or more of: a signal strength indicator associated with a signal, a time indicator indicative of time of flight or phase shift associated with a signal, an indicator of time of arrival, and an indicator of direction of arrival. The method 200 comprises transmitting S206, in a first signal, the reference data and the sensor data to a location server device (e.g. location server device 500 of FIG. 1 or 5). The location server device may then obtain or generate the primary location information based on the reference data in the first signal.

The method 200 performed by the reference electronic device supports a secure architecture for localization which is robust against replay attacks, when reference electronic devices are involved.

Optionally, the reference data comprises timing data associated with the signal, e.g. timestamps of receipt of the signal at the reference electronic device.

In one or more exemplary methods and reference electronic devices, generating S204 reference data comprises generating S204A a reference signal comprising the reference data and the sensor data. In one or more exemplary methods and reference electronic devices, transmitting S206 the reference data and the sensor data to the location server device comprises transmitting S206A the reference signal comprising the reference data and the sensor data to the location server device.

In one or more exemplary methods and reference electronic devices, transmitting S206 the reference data and the sensor data to the location server device comprises encrypting S206B the reference data and optionally the sensor data using shared keying material. The shared keying material may be a symmetric session key generated during secure channel establishment with the location server device. The shared keying material comprises for example a symmetric session key generated during secure channel establishment (using a shared secret or a public key infrastructure, PKI, based handshake).

Figure 4:
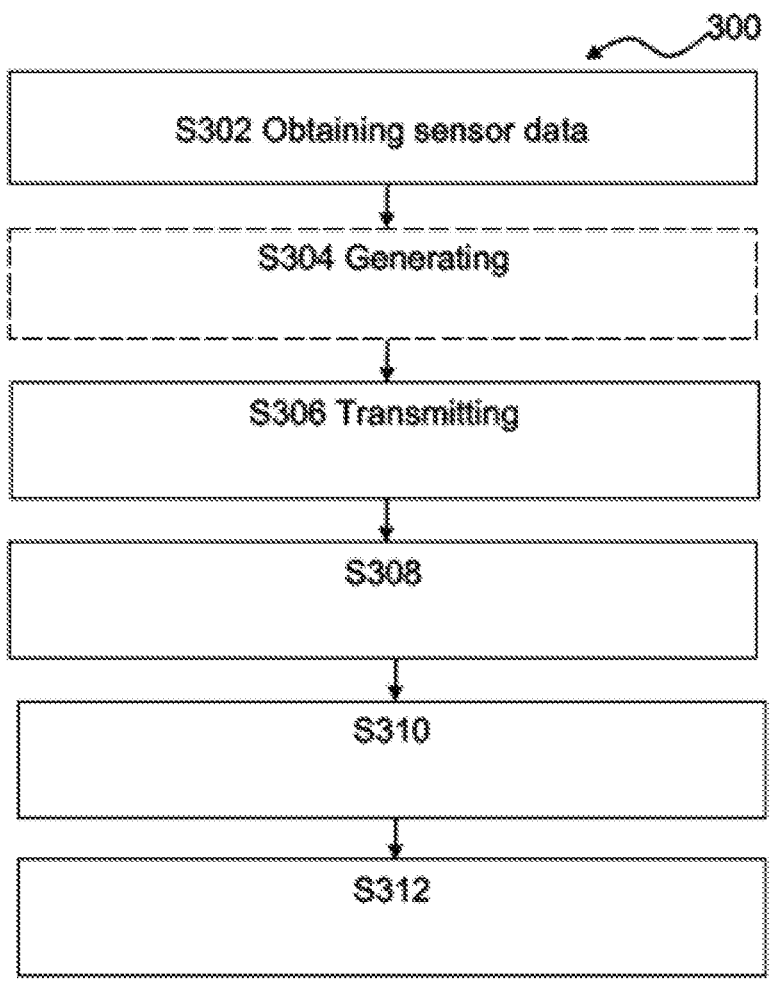
FIG. 4 is a flow diagram of an exemplary method performed by a location system according to the disclosure.

FIG. 4 is a flow diagram of an exemplary method 300 performed by a location system (e.g. location system 800 of FIG. 1) comprising a wireless communication device and a location server device (e.g. the location server device disclosed herein) according to the disclosure for enabling secure localization. The wireless communication device (e.g. wireless communication device 700 of FIG. 1 or 7) comprises a sensor. The method 300 is performed for enabling secure localization of a wireless communication device The method 300 comprises obtaining S302, at the wireless communication device, sensor data from the sensor (e.g. sensor 704 of FIG. 7), The method 300 comprises transmitting S306, from the wireless communication device, a signal comprising an identifier identifying the wireless communication device, and the sensor data, to e.g. the location server device, e.g. via one or more reference electronic devices. Transmitting S306 the signal may comprise broadcasting the signal. The method 300 comprises obtaining S308, at the location server device, the signal comprising the sensor data sensed by the wireless communication device; obtaining S310, at the location server device, primary location information of the wireless communication device, and validating S312, at the location server device, the primary location information based on the sensor data.

Optionally, the method 300 comprises generating S304, at the wireless communication device, a signal comprising the identifier identifying the wireless communication device, and the sensor data.

The method 300 performed by the location system supports a secure architecture for localization which is robust against replay attacks by including a sensor data in the broadcasted signal.

Optionally, the sensor data comprises motion sensor data and/or timing data (e.g. timestamped motion sensor data). Sensor data comprises for example one or more parameters characterizing any one or more of: a movement, a series of movements; a position, an orientation; a path, a pressure, an electrical field, a vibration, a tilt, and a sound, and other parameters related to motion. Sensor data may be obtained by one or more sensors, of the wireless communication device, configured to detect motion of the wireless communication device and/or to measure motion sensor data related to the motion of the wireless communication device.

Optionally, generating S304 a signal comprising an identifier identifying the wireless communication device, and sensor data comprises encrypting and protecting integrity of the sensor data and the identifier using a keying material shared with the location server device.

FIG. 5 is a block diagram schematically illustrating an exemplary location server device 500 according to the disclosure. The location server device 500 comprises comprising a memory module 501, an interface module 502, and a processor module 503. The location server device 500 is configured to perform any of the methods disclosed herein in relation to FIGS. 2A and 2B.

The interface module 502 may be configured for communication using a wireless communication system and/or a wired communication system (e.g. an Internet Protocol, IP-based system, and/or an Ethernet-based system). Examples of wireless communication systems comprise a short-range communication system (e.g. a near-field communication system, a BLUETOOTH system, an ultra-wide band system, ZIGBEE, IEEE 802.11) and/or a cellular communication system (e.g. a 3rd Generation Partnership Project, 3GPP, cellular system), and/or a wireless local area network system (e.g. IEEE 802.11) and/or an acoustic localization system (e.g. Sound Navigation And Ranging, SONAR, system).

The location server device 500 is configured to, via the interface module 502 and the processor module 503, obtain first sensor data sensed by the wireless communication device (e.g. to receive the first sensor data associated with the wireless communication device, e.g. via a signal). The location server device 500 is configured to, via the memory module 501 and/or the interface module 502 and/or the processor module 503, obtain primary location information of the wireless communication device (e.g. to receive, and/or generate the primary location information).

The location server device 500 is configured to, via the processor module 503, validate the primary location information based on the first sensor data. Hence, the processor module 503 may comprise a validator module 503A.

The processor module 503 (hence e.g. the validator module 503A) may be configured to validate the primary location information based on the first sensor data by determining secondary location information based on the first sensor data. In one or more exemplary location server devices, the processor module 503 may be configured to validate the primary location information based on the first sensor data by verifying the primary location information using the secondary location information, e.g. by comparing the primary location information and the secondary location information, e.g. by correlating primary location information and the secondary location information.

The location server device 500 provides, inter alia, an improved security and robustness against replay attacks from adversarial electronic devices attempting to corrupt the localization.

The validator module 503A may be configured to perform any one or more of the steps S112, S118, S114, S116 of FIG. 2B The processor module 503 may comprise a secure module 503B for performing security operations related to establishing a secure channel (e.g. in step S101, and/or S101A of FIG. 2A), to decrypting received data (e.g. in step S110 of FIG. 2A).

A reference electronic device may act as a location server device 500.

Optionally, the first sensor data comprises motion sensor data.

The memory module 501 is configured to store location information in a part of the memory module 501 of the location server device. Additionally, or alternatively, the memory module 501 is configured to store location information of a wireless communication device, and/or an identifier of a wireless communication device, and/or sensor data obtained and sensed by a wireless communication device. The processor module 503 is optionally configured to perform any of the operations disclosed in FIGS. 2A-2B. The operations of the location server device 500 may be embodied in the form of executable logic routines (e.g., lines of code, software programs, etc.) that are stored on a non-transitory computer readable medium (e.g., the memory module 501) and are executed by the processor module 503.

Furthermore, the operations of the location server device 500 may be considered a method that the location server device is configured to carry out. Also, while the described functions and operations may be implemented in software, such functionality may as well be carried out via dedicated hardware or firmware, or some combination of hardware, firmware and/or software.

FIG. 6 a block diagram schematically illustrating an exemplary reference electronic device 600 according to the disclosure. The reference electronic device 600 comprises a memory module 601, an interface module 602, and a processor module 603. The reference electronic device 600 is configured to perform any of the methods disclosed herein in relation to FIG. 3.

Figure 7:
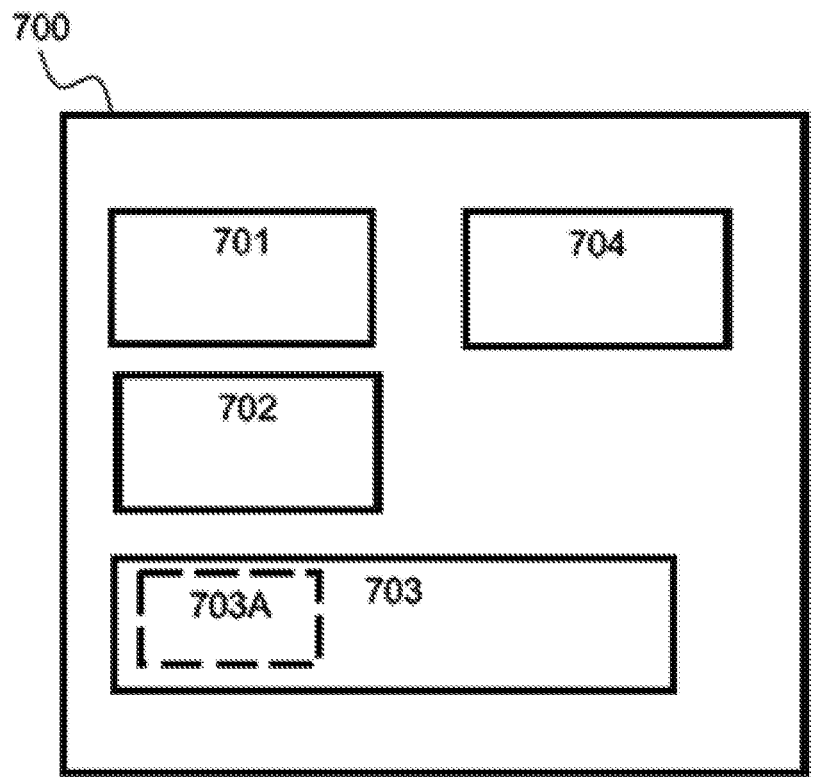

The reference electronic device 600 is configured to receive, via the interface module 602, a signal from a wireless communication device (e.g. wireless communication device 700 of FIG. 1 or 7). The signal comprises an identifier identifying the wireless communication device, and sensor data sensed by the wireless communication device (e.g. wireless communication device 700 of FIG. 1 or 7). Optionally, the sensor data comprises motion sensor data.

The reference electronic device 600 is configured to generate, via the processor module 603, reference data based on the signal. The reference data comprises an indicator of a signal characteristic associated with a signal received at the reference electronic device from the wireless communication device (e.g. wireless communication device 700 of FIG. 1 or 7). The indicator comprises for example one or more of: a signal strength indicator associated with a signal, a time indicator indicative of time of flight or phase shift associated with a signal, an indicator of time of arrival, and an indicator of direction of arrival.

The reference electronic device 600 is configured to transmit, via the interface module 602, the reference data and the sensor data to a location server device (e.g. location server device 500 of FIG. 1 or 5). The interface module 602 may be configured for communication using a wireless communication system. Examples of wireless communication systems comprise a short-range communication system (e.g. a near-field communication system, a BLUETOOTH system, an ultra-wide band system, ZIGBEE, IEEE 802.11) and/or a cellular communication system (e.g. a 3rd Generation Partnership Project, 3GPP, cellular system), and/or a wireless local area network system (e.g. IEEE 802.11) and/or an acoustic localization system (e.g. Sound Navigation And Ranging, SONAR, system).

The reference electronic device 600 disclosed herein supports a secure architecture for localization which is robust against replay attacks, when reference electronic devices are involved.

Optionally, the reference data comprises timing data associated with the signal, e.g. timestamps of receipt of the signal at the reference electronic device 600.

Optionally, the reference electronic device 600 is configured to, via the processor module 603, generate reference data based on the signal by generating a reference signal comprising the reference data and the sensor data. In one or more exemplary methods and reference electronic devices, transmitting S206 the reference data and the sensor data to the location server device comprises transmitting S206A the signal to the location server device.

The reference electronic device 600 is optionally configured to transmit, via the interface module 602 and the processor module 603, the reference data and the sensor data to the location server device by encrypting the reference data and optionally the sensor data using shared keying material. The shared keying material may be a symmetric session key generated during secure channel establishment with the location server device. The shared keying material comprises for example a symmetric session key generated during secure channel establishment (using a shared secret or a public key infrastructure, PKI, based handshake). The processor module 603 may comprise a secure module 603A to store the shared keying material and perform cryptographic operations including encryption of the reference data.

The processor module 603 may comprise a secure module 603B for performing security operations related to transmitting securely to the location server device a secure channel (e.g. in step S206B of FIG. 2A).

A reference electronic device may act as a location server device 500, thus a reference electronic device may be configured to perform any of the steps disclosed in FIGS. 2A-2B.

Additionally, or alternatively, the memory module 601 is configured to store location information of a wireless communication device, and/or an identifier of a wireless communication device, and/or sensor data obtained from a wireless communication device.

The processor module 603 is optionally configured to perform any of the operations disclosed in FIG. 3 or FIGS. 2A-2B when acting as a location server device. The operations of the reference electronic device 600 may be embodied in the form of executable logic routines (e.g., lines of code, software programs, etc.) that are stored on a non-transitory computer readable medium (e.g., the memory module 601) and are executed by the processor module 603).

Furthermore, the operations of the reference electronic device 600 may be considered a method that the reference electronic device 600 is configured to carry out. Also, while the described functions and operations may be implemented in software, such functionality may as well be carried out via dedicated hardware or firmware, or some combination of hardware, firmware and/or software.

FIG. 7 a block diagram schematically illustrating an exemplary wireless communication device 700 according to the disclosure. The wireless communication device 700 comprises a memory module 701, an interface module 702, a processor module 703 and a sensor 704. The wireless communication device 700 is configured to perform any of the methods disclosed herein in relation to FIG. 4 (e.g. step S302, S304, S306).

The wireless communication device 700 is configured to obtain, via the processor module 703, sensor data from the sensor 704. The wireless communication device 700 may be configured to generate, via the processor module 703, a signal comprising an identifier identifying the wireless communication device 700, and sensor data. Hence, the processor module 703 may comprise a generator module 703A. The wireless communication device 700 is configured to transmit (e.g. broadcast), via the interface module 702, the signal. The interface module 702 may be configured for communication using a wireless communication system. Examples of wireless communication systems comprise a short-range communication system (e.g. a near-field communication system, a BLUETOOTH system, an ultra-wide band system, ZIGBEE, IEEE 802.11) and/or a cellular communication system (e.g. a 3rd Generation Partnership Project, 3GPP, cellular system), and/or a wireless local area network system (e.g. IEEE 802.11) and/or an acoustic localization system (e.g. Sound Navigation And Ranging, SONAR, system).

The wireless communication device 700 disclosed herein supports a secure architecture for localization which is robust against replay attacks by including a sensor data in the broadcasted signal.

Optionally, the sensor data comprises motion sensor data and/or timing data (e.g. timestamped motion sensor data). Sensor data comprises for example one or more parameters characterizing any one or more of: a movement, a series of movements; a position, an orientation; a path, a pressure, an electrical field, a vibration, a tilt, and a sound, and other parameters related to motion. The sensor 704 may comprise a motion sensor, e.g. an accelerometer, and/or a gyroscope, and/or a tilt sensor, and/or a vibration sensor, and/or an optical sensor configured to detect a movement.

Optionally, processor module 703 is configured to generate a signal comprising an identifier identifying the wireless communication device, and sensor data by encrypting and protecting integrity of the sensor data and the identifier using a keying material shared with the location server device (e.g. by using a secure module 703A). This is to ensure end-to-end security between the wireless communication device 700 and the location server device.

The processor module 703 is optionally configured to perform any of the operations disclosed in Steps S302, S304 and S306 of FIG. 4 The operations of the wireless communication device 700 may be embodied in the form of executable logic routines (e.g., lines of code, software programs, etc.) that are stored on a non-transitory computer readable medium (e.g., the memory module 701) and are executed by the processor module 703).

Furthermore, the operations of the wireless communication device 700 may be considered a method that the wireless communication device 700 is configured to carry out. Also, while the described functions and operations may be implemented in software, such functionality may as well be carried out via dedicated hardware or firmware, or some combination of hardware, firmware and/or software.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It may be appreciated that FIGS. 1-7 comprises some modules or operations which are illustrated with a solid line and some modules or operations which are illustrated with a dashed line. The modules or operations which are comprised in a solid line are modules or operations which are comprised in the broadest example embodiment. The modules or operations which are comprised in a dashed line are example embodiments which may be comprised in, or a part of, or are further modules or operations which may be taken in addition to the modules or operations of the solid line example embodiments. It should be appreciated that these operations need not be performed in order presented. Furthermore, it should be appreciated that not all of the operations need to be performed. The exemplary operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

The various exemplary methods, devices, nodes and systems described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform specified tasks or implement specific abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents.

The invention claimed is:

1. A method, performed by a location server device, for securely validating localization of a wireless communication device, the method comprising:
    obtaining first sensor data sensed by the wireless communication device, wherein obtaining the first sensor data sensed by the wireless communication device comprises receiving a first signal associated with the wireless communication device;
    obtaining, based on the first signal from a first reference electronic device, primary location information of the wireless communication device;
    determining secondary location information based on the first sensor data, and
    validating the primary location information based on the first sensor data by correlating the primary location information and the secondary location information.

2. The method according claim 1, wherein obtaining the primary location information of the wireless communication device comprises receiving the primary location information in the first signal.

3. The method according to claim 1, wherein obtaining the first sensor data sensed by the wireless communication device comprises receiving, from the first reference electronic device of a group of reference electronic devices, the first signal comprising first reference data and the first sensor data sensed by the wireless communication device.

4. The method according to claim 3, wherein the first reference data comprises an indicator of a signal characteristic associated with a signal received at the first reference electronic device from the wireless communication device, wherein the indicator comprises one or more of: a signal strength indicator associated with the signal, a time indicator indicative of time of flight or phase shift associated with the signal, an indicator of time of arrival, and an indicator of direction of arrival.

5. The method according to claim 3, wherein obtaining the primary location information of the wireless communication device comprises generating the primary location information based on the first reference data.

6. The method according to claim 1, wherein the method comprises: receiving second reference data, wherein receiving the second reference data comprises receiving second sensor data sensed by the wireless communication device, and wherein validating the primary location information based on the first sensor data comprises validating the primary location information based on the first sensor data and the second sensor data.

7. The method according to claim 6, wherein the first sensor data comprises motion sensor data and/or timing data; and/or wherein the second sensor data comprises motion sensor data and/or timing data.

8. The method according to claim 1, the method comprising: establishing a secure channel between the location server device and the first reference electronic device.

9. The method according to claim 8, wherein establishing a secure channel comprises receiving encrypted signals and/or integrity-protected signals and/or authenticating the first reference electronic device.

10. The method according to claim 1, the method comprising decrypting received data using shared keying material.

11. The method according to claim 1, the method comprising:
    in accordance with a determination that the primary location information is not validated:
        rejecting the primary location information; and
        transmitting, to the first reference electronic device, a server message comprising an indication that the wireless communication device is to be excluded from a location system comprising the location server device.

12. A location server device comprising a memory module, an interface module, and a processor module, wherein the location server device is configured to perform the method according to claim 1.

13. A method, performed by a reference electronic device, for securely validating localization of one or more wireless communication devices, the method comprising:
    receiving a signal from a wireless communication device, wherein the signal comprises an identifier identifying the wireless communication device, and sensor data sensed by the wireless communication device;
    generating reference data based on the signal, wherein reference data comprises an indicator of a signal characteristic associated with the signal received at the reference electronic device from the wireless communication device, wherein the indicator comprises one or more of: a signal strength indicator associated with the signal, a time indicator indicative of time of flight or phase shift associated with the signal, an indicator of time of arrival, and an indicator of direction of arrival; and
    transmitting the reference data and the sensor data to a location server device.

14. The method according to claim 13, wherein transmitting the reference data and the sensor data to a location server device comprises encrypting the reference data and the sensor data using shared keying material.

15. A reference electronic device comprising a memory module, an interface module, and a processor module, wherein the reference electronic device is configured to perform the method according to claim 13.

16. A method, performed by a location system for enabling secure localization of a wireless communication device, wherein the location system comprises the wireless communication device, a reference electronic device and a location server device, the wireless communication device comprising a sensor, the method comprising:

obtaining, at the wireless communication device, sensor data from the sensor;

transmitting, from the wireless communication device, a signal comprising an identifier identifying the wireless communication device, and the sensor data;

obtaining, at the location server device, the sensor data sensed by the wireless communication device, wherein obtaining the sensor data sensed by the wireless communication device comprises receiving a first signal associated with the wireless communication device;

obtaining, at the location server device, primary location information of the wireless communication device based on the first signal from the reference electronic device, determining secondary location information based on the first sensor data; and validating, at the location server device, the primary location information based on the sensor data by correlating the primary location information and the secondary location information.

17. The method according to claim 16, wherein obtaining the sensor data sensed by the wireless communication device comprises receiving, at the location server device, the first signal comprising the sensor data from the reference electronic device.

18. The method according to claim 16, wherein the sensor data comprises motion sensor data and/or timing data.

\* \* \* \* \*